(12) United States Patent
Heuer

(10) Patent No.: US 6,941,299 B2
(45) Date of Patent: Sep. 6, 2005

(54) METHOD FOR QUERYING A DATABASE

(75) Inventor: Joerg Heuer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 253 days.

(21) Appl. No.: 09/784,352

(22) Filed: Feb. 16, 2001

(65) Prior Publication Data
US 2002/0083052 A1 Jun. 27, 2002

(30) Foreign Application Priority Data
Feb. 16, 2000 (DE) .......................... 100 06 959

(51) Int. Cl.[7] .............................................. G06F 17/30
(52) U.S. Cl. ................... 707/4; 707/3; 707/5; 707/10; 707/101; 707/102
(58) Field of Search .......................... 707/3, 4, 5, 10, 707/101, 102

(56) References Cited

U.S. PATENT DOCUMENTS

| | | | | |
|---|---|---|---|---|
| 5,742,809 A | * | 4/1998 | Hayashi et al. ................ | 707/2 |
| 6,078,914 A | * | 6/2000 | Redfern ........................ | 707/3 |
| 6,092,080 A | * | 7/2000 | Gustman ................ | 707/103 R |
| 6,148,307 A | * | 11/2000 | Burdick et al. .......... | 707/104.1 |
| 6,212,518 B1 | * | 4/2001 | Yoshida et al. ................ | 707/5 |
| 6,233,578 B1 | * | 5/2001 | Machihara et al. ........... | 707/10 |
| 6,236,997 B1 | * | 5/2001 | Bodamer et al. ............. | 707/10 |
| 6,345,269 B1 | * | 2/2002 | Kappenberger et al. ....... | 707/3 |
| 6,347,315 B1 | * | 2/2002 | Kiyoki et al. .................. | 707/5 |
| 6,397,225 B1 | * | 5/2002 | Brown et al. ............ | 707/104.1 |
| 6,405,209 B2 | * | 6/2002 | Obendorf ................ | 707/103 R |
| 6,418,428 B1 | * | 7/2002 | Bosch et al. ................... | 707/2 |
| 6,453,310 B1 | * | 9/2002 | Zander .......................... | 707/1 |
| 2003/0208473 A1 | * | 11/2003 | Lennon ......................... | 707/3 |

FOREIGN PATENT DOCUMENTS

DE          196 44 703 A1     4/1998

* cited by examiner

Primary Examiner—Jean M. Corrielus
Assistant Examiner—Chongshan Chen
(74) Attorney, Agent, or Firm—Staas & Halsey LLP

(57) ABSTRACT

The invention relates to a method for querying a database with database contents that have a database structure. The query is made in a query structure, which differs from the database structure in that the query structure and the database structure reference a standard structure, and the reference logic is at least partially transmitted together with the query and/or is at least partially present in the database.

21 Claims, 1 Drawing Sheet

METHOD FOR QUERYING A DATABASE

CROSS-REFERENCE TO RELATED APPLICATIONS

This application is based upon and claims priority to German Patent Application No. 10006959.2 filed Feb. 16, 2000, the contents of which are incorporated herein by reference.

BACKGROUND OF THE INVENTION

The invention relates to a method for querying a database.

Such methods for querying databases are used to obtain information that falls within a certain search pattern. The databases store not only the data contents, such as measurement data, picture data, etc., but also characteristics, or so-called meta data, which characterize the data contents. In a database query, these characteristics, which satisfy the conditions of the query can thus be used, among other things, to classify the database content.

To be able to formulate such classification criteria, however, the physical memory structure of the characteristics and their semantic meaning has to be known.

Thus, the drawback is that corresponding requesting clients are always written for a specific database with a defined structure. If a user wants to direct an inquiry or query to a database, he must therefore know the corresponding client or query program or the data structure of the database.

In a query to a single database, a special client program for that database is therefore normally used. In case of a connection to the database via a network (LAN or WAN, Internet, etc.) the client program is loaded onto the client computer upon logging into the database, for example as a plug-in for a browser.

In contrast, if several databases are to be addressed simultaneously, this is realized via a corresponding interface, or middleware, of a server or a database. Several clients (or wrappers) are realized in the middleware on the server or in a database. The client is defined for the middleware. Since the wrappers are implemented in the middleware, the disadvantage is that only those databases that were previously analyzed with respect to their data structure and API (Application Program Interface) can be integrated via the middleware.

As a consequence, the known methods for querying databases depend on the latter's data structure to the extent that the respective structure of a database must be known for a query. This has the drawback that a query of a database is made more difficult, particularly if its exact structure is unknown to the inquirer.

SUMMARY OF THE INVENTION

Thus, the object of the invention is to create a method for querying databases, which permits a query or inquiry of a database whose exact structure is unknown.

This and other objects are attained by a method for querying a database. Referencing a standard structure according to the invention makes it possible to keep the query's structure general. This permits a simplified and general query since there is no longer any need to know the special structure of a database. In addition, one and the same query can be advantageously used for a plurality of databases with different special structures.

In an advantageous embodiment of the invention, both query structure and the database structure are described by special descriptors, which reference standard descriptors. Since the standard descriptors themselves are available in addition, both a query and a database can be individually adapted for any application.

To compute the special descriptors from the standard descriptors and vice versa, a reference logic that is at least partially known in the database is used. It is also possible, however, to transmit said reference logic together with the query. This advantageously makes the structure of a query even more independent from the database structure, which can thus be kept more general.

In a preferred embodiment of the invention, upon a query, the matching standard and special descriptors contained in the database and the query are first determined. For non-matching descriptors, the associated descriptors are derived by means of a reference logic that is present or known in the database or is transmitted together with the query. For example, a standard descriptor of the database can be inferred from a special descriptor of the query, or a special descriptor of the database can be inferred from a standard descriptor of the query.

It is also feasible, however, to use reference logic to map a query's special descriptor to a standard descriptor which, in turn, is mapped to a special descriptor of the database via a corresponding reference logic, so that the query is even more independent of the database structure.

Since information on data contents can get lost in mapping or deriving a standard descriptor to a special descriptor and vice versa, it is also feasible, however, to convert a special descriptor of the query directly into a different but similar special descriptor of the database. The required computation logic can either exist in the database or be transmitted together with the query, as described above for the reference logic.

This makes it possible advantageously to avoid a potential loss of information.

To describe the special descriptors, semantic, physical and atomic elements can be used as the computation logic in order to define the semantic meaning, the physical memory structure and the link between memory structure and semantics. Although the individual atomic elements vary little in the different descriptors, in combination they advantageously result in a wide variation range.

If a database has a database structure that references a standard structure as described above, general queries that are largely independent from the database structure can advantageously be processed in said database.

BRIEF DESCRIPTION OF THE DRAWINGS

The invention will now be described in greater detail, by way of example, with reference to the drawing in which.

DETAILED DESCRIPTION OF THE PREFERRED EMBODIMENTS

Figure 1:
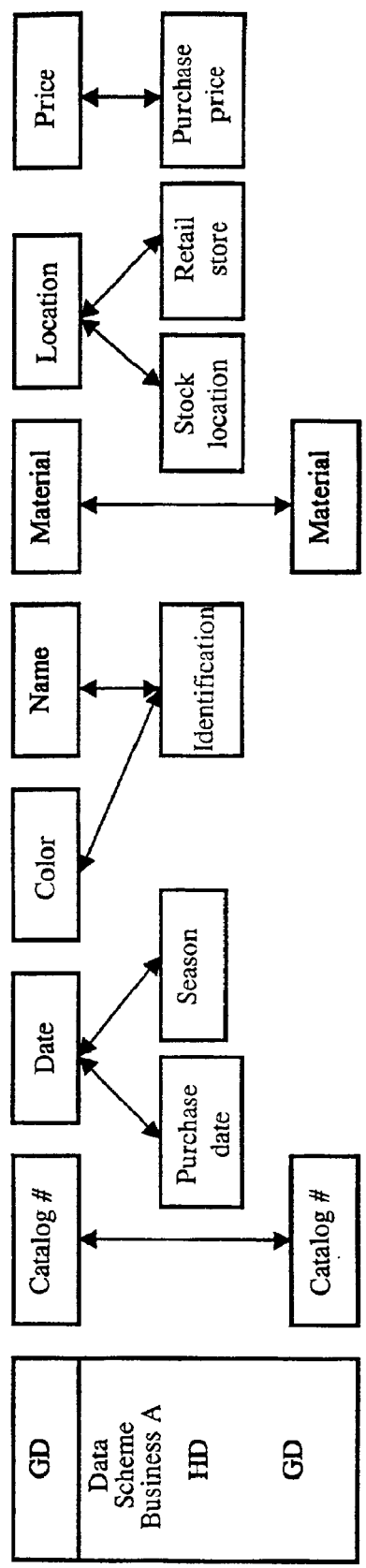
FIG. 1 is a data scheme of a database of a clothing business to carry out the query method according to the invention.

FIG. 1 shows a simple example of the method according to the invention referring to a fashion catalog of a clothing business A. As may be seen from this diagram, the descriptors "catalog number," "date," "color," "name," "material," "location" and "price" are defined as standard descriptors GD, typically in string format, and are known on both the query side and the database side.

On the database side, business A, in addition to using these standard descriptors GD, can also use special descriptors HD, such as "purchase date," "season," "description," "stock location," "retail store," and selling price," so that the structure of the database can be optimally adapted to the application.

These special descriptors HD in the database can be derived from the "standard descriptors" by a reference logic.

From the standard descriptor "date," for instance, both the special descriptor "purchase date" and the special descriptor "season" can be established. It should be noted that the only date known is usually the date of production or delivery, from which a purchase date and/or the corresponding season (summer, fall, spring, and winter collection) can at least approximately be established (e.g., by fixed typical time spans between production and purchase).

Conversely, the special descriptors "purchase date" and/or "season" can be used to infer at least a time span for a production date, which in FIG. 1 is indicated by the double arrows.

Thus, several, for example two, special descriptors HD may follow from one standard descriptor GD. As shown in FIG. 1, instead, it is also possible to derive only one special descriptor "selling price" from one standard descriptor "(purchase) price" by means of a corresponding reference logic, or one special descriptor "description" from several, for example two, standard descriptors "color" and "name," or vice versa.

The corresponding reference logic in this case may be, for example, a percentage markup (fixed profit margin) on the purchase price to determine the selling price. Another logic, however, may concern the position (prefix or postfix and separation by a hyphen) or the notation of the content of the special descriptor "description" (e.g., color in lower case letters and name in capital letters), so that said logic can be used to derive special descriptors from standard descriptors and vice versa.

To show the derivation possibilities in both directions in FIG. 1, the standard descriptors GD are linked with double arrows to special descriptors HD or in turn with standard descriptors GD.

The method for querying the database will now be described by means of the example of a special descriptor "description" with stored data content—for instance "red/blue PANTS"—and reference logic "name" in capital letters and "color" in lower case letters.

If a query is addressed to the database of business A, not only the employed special descriptors and standard descriptors must be defined as a query but also the standard descriptors GD underlying the special descriptors HD. In the "description" example, this means, for instance, that all words in lower case letters in the value range of the query are interpreted as "color" and all words in capital letters as "name." Correspondingly, in case of a query with standard descriptors GD to the database of business A, the reference logic must be used to derive the special descriptors HD from the standard descriptors GD.

In contrast to the above example, however, the derivation from special descriptors HD to standard descriptors GD and vice versa may also be ambiguous, as described for the case of "purchase date," "season," and "date." Nevertheless, a query can achieve better selectivity with respect to both the "purchase date" and the "season" descriptor than with a general keyword search, or by even omitting the descriptor.

The proposed method thus allows queries to be made based on descriptors and their semantic meaning without any concrete knowledge of the data scheme.

In contrast to the described middleware solution of the prior art, the invention requires no central server, which knows the data schemes of the database, since each database itself is responsible for the derivation of the scheme from the standard descriptors. This does not imply, however, that changes must be made in the existing data scheme. This decentralized solution further makes it possible to integrate an unlimited number of databases in the search, where each database administrator is responsible for implementing the derivations and the matching criteria.

The scenario of a query of a database, which does not necessarily need to be a physical database, is for instance as follows, omitting trivial steps, such as evaluation of the matching standard descriptors GD:

1. The query is formulated on the client side with the available descriptors (standard and special descriptors) and is sent to the database.
2. The database first considers the special descriptors, forms the cut set with the special descriptors HD that are stored in the database, and evaluates it.
3. For the remaining special descriptors HD received, i.e., those that are not contained in the database, referencing standard descriptors GD are evaluated.
4. For the standard descriptors GD that are not used in the database, the database checks which of these standard descriptors were referenced by special descriptors HD and from the reference logic computes a query with these special descriptors HD.

The sequence of steps 1 to 4 is of course not mandatory for the method to function. A sequence of 1-4-2-3, for instance, is equally feasible. In addition, step 4, used advantageously to consult further descriptors for the query, is only optional, so that the query procedure according to the invention can be executed with only steps 2 and/or 3, depending on whether standard descriptors GD and/or special descriptors HD occur in the query.

This method makes it possible on the client side to use descriptors that are optimal for each application, without being limited to data, which was described by these special descriptors. It is further possible, prior to the database query, to determine the percentage share that a special descriptor has in the description of a data type (e.g., within the log-in protocol between client and server) and to load the reference logic (computation code and possibly GUI plug-in) of the most common descriptors in order to use the characteristics described by them efficiently. For this purpose it is feasible to store or reference in the database the computation code or GUI Applet of the special descriptors used in the database to compute the characteristics from the data that is to be described.

With the method according to the invention, descriptors deviating from the GDs can be used for description not only on the client side but also on the database side. This may allow for better indexing, for instance, without making impossible a query with the GD standard descriptors.

This example also shows that, compared with the standard descriptors GD, a special descriptor does not necessarily have to be a more selective descriptor.

It should be noted that to form an optimal cut set from the special descriptors in the database query and the special descriptors in the database, said descriptors should be defined as unambiguously as possible. If the computation code is realized with "distributed object" methods, the descriptors can be derived from the unambiguous IDs of the object classes (GUID/DCOM or IOR/CORBA). This has the advantage that the computation code is referenced together with the descriptor identification. A further possibility is to describe the descriptors by means of so-called atomic elements, which will be discussed below by way of example.

In queries with a plurality of descriptors, each with low information content (normally of the integer or string type), this method loses little information by derivations. But in complex descriptors with very specific information, which occur, for instance, in the description of pictures, the information loss is usually greater. Here, it would be advantageous to convert similar special descriptors HD directly without the large information loss due to derivation via standard descriptors GD.

We will now discuss, by means of an example, how special descriptors can be described in order to classify them as similar and to be able to convert one special descriptor HD into another, without knowing one of the two special descriptors.

For this purpose, special descriptors HD are described by three types of elements, so-called "atomic elements": semantic atomic element (sAE), physical atomic elements (pAE) and linking atomic elements (vAE), which define the semantic meaning, the physical memory structure of the stored quantity and the link between memory structure and semantics. This procedure results from the observation that the individual atomic elements in the different descriptors vary little but in combination produce a wide variation range. For example, histograms (vAE) are frequently used for the descriptors of images, but they vary in their granularity (pAE) and meaning (color, invariants, etc.) (sAE).

Corresponding to the procedure in the derivation via standard descriptors GD, the AEs, too, are standardized and known to both the client and the server. In contrast to the procedure in the standard descriptors GD, however, it may be necessary to update the AEs. This is particularly true for the sAEs, since here new descriptor types are more often introduced. In contrast, the pAEs and vAEs are less involved since they are subject to strong restrictions from the side of the database and the programming language.

Below, an example of the above-described procedure is discussed. It is assumed that the semantic AE (sAE) Color ( ) the physical AE (pAE) Integer, Real, Array<pAE> [ ] and the linking AE (vAE) Histogram ( ) are declared as follows:

Color (vAE, ColorSpace) represents a color description (sAE) with a vAE in the ColorSpace $\in$ (RGB, YUV, . . . ), Histogram (Integer Dim, (Real Bottom0, Real Top0, Real Step0), . . . , Array<pAE>[Integer (Top0-Bottom0)/ Sept0], . . . ) a multidimensional histogram.

A simple, three-dimensional color histogram 3DCHist in the RGB color space can thus be described as follows:

| 3DCHist: | Color(Histogram(3, (0,255,32), (0,255,32), (0,255,32), Array<Array<Array<Integer>[ ]> [ ]>[ ]), RGB). |
|---|---|

The histogram is thus three-dimensional and in each color space dimension (RGB) is divided into 8 bins.

A further color histogram 3DCHistLarge is described by

| 3DCHistLarge: | Color(Histogram(3, (255,0,16), (255,0,16), (255,0,16), Array<Array<Array<Real>[ ]>[ ]> [ ]),RGB). |
|---|---|

A query based on the histogram 3DCHistLarge can now be processed in a database realized with the descriptors in the 3DCHist format, without 3DCHistLarge having to be explicitly known in advance. For this purpose, the descriptor definition (similar to an interface definition) is transmitted suitably encoded. A conversion into the 3DCHist descriptor used in the database can then be effected based on this descriptor definition in that the sequence of the bins is exchanged (255,0→0,255), the number of the bins per color space dimension is reduced, and their entries are suitably converted (Real→Integer).

In contrast to a conversion or derivation of these mutually similar special descriptors on the client and database side via a standard descriptor, as described above, an unnecessary information loss can advantageously be avoided.

For example, the direct computation by means of the computation logic of a color histogram for the red component with 256 entries as a special descriptor on the client side into a color histogram for the red component with 128 entries as a special descriptor on the database side eliminates the unnecessary data loss that would occur if, as an intermediate step, a more remote (standard) descriptor were referenced, e.g., a color histogram for the red component with 8 entries.

This makes it possible to avoid an unnecessary information loss by selective transmission of the computation logic or the GUI for individual descriptors in addition to referencing general standard descriptors GD.

It should be noted that this special case of direct computation can of course be viewed as a query with a standard descriptor as opposed to an associated special descriptor on the database side, or vice versa. The reference logic is then represented by the computation logic or the computation rule.

The invention has been described in detail with particular reference to preferred embodiments thereof and examples, but it will be understood that variations and modifications can be effected within the spirit and scope of the invention.

What is claimed is:

1. Method for querying a database with database contents stored in a computer readable medium with a database structure comprising:

placing a query in a query structure that differs from the database structure,
wherein the query structure and the database structure are derived from a standard structure by using a reference logic,
wherein the standard structure is described by standard descriptors,
wherein the query structure and the database structure are described by at least one of the standard descriptors and special descriptors, and
wherein the special descriptors and the content of the special descriptors are derived from at least one of the standard descriptors by using the reference logic, transmitting the query to the database;
making the reference logic available to the database by at least one of:
transmitting at least part of the reference logic together with the query; or
the reference logic being at least partially present in the database,
if the standard descriptors of the query structure and the standard descriptors of the database structure are dissimilar, a special descriptor of the database structure can be inferred from the standard descriptor of the query structure by means of the reference logic, or if the special descriptors of the query structure and the special descriptors of the database structure are dissimilar, a standard descriptor of the database structure can be inferred from the special descriptor of the query structure by means of the reference logic, wherein if the special descriptors of the query structure and the special descriptors of the database structure are dissimilar, dissimilar special descriptors are reviewed to determine whether a computation logic is present in the database, so that a respective special descriptor of the database structure can be computed directly from the corresponding special descriptor of the query structure by means of the computation logic.

2. Method as claimed in claim 1, wherein the reference logic is stored in the database.

3. Method as claimed in claim 1, wherein standard descriptors present in the query structure are compared with the standard descriptors of the database, wherein identical standard descriptors are evaluated for the query.

4. Method as claimed in claim 1, wherein the special descriptors present in the query structure are compared with the special descriptors of the database, wherein identical special descriptors are evaluated for the query.

5. Method as claimed in claim 1, wherein the computation logic is stored in the database.

6. Method as claimed in claim 5, wherein, for the special descriptors of the database structure that are dissimilar to the special descriptors of the query structure for which no computation logic is present, a review is made to determine whether a reference logic to standard descriptors is at least partially present in the database.

7. Method as claimed in claim 5, wherein, for the special descriptors of the database structure that are dissimilar to the special descriptors of the query structure for which no computation logic and/or no reference logic is present, a review is made to determine whether the reference logic was transmitted together with the query.

8. Method as claimed in claim 5, wherein atomic elements defining the information and/or link of a special descriptor are used as the computation logic.

9. Method as claimed in claim 8, wherein the atomic elements used are semantic, physical and linking atomic elements to define the semantic meaning, the physical memory structure, and the link between memory structure and semantics.

10. Computer readable media embodying a database structure to execute a method comprising:

placing a query in a query structure that differs from the database structure,
wherein the query structure and the database structure are derived from a standard structure by using a reference logic,
wherein the standard structure is described by standard descriptors,
wherein the query structure and the database structure are described by at least one of the standard descriptors and special descriptors, and
wherein the special descriptors and the content of the special descriptors are derived from at least one of the standard descriptors by using the reference logic,
transmitting the query to the database;
making the reference logic available to the database by at least one of:
transmitting at least part of the reference logic together with the query; or
the reference logic being at least partially present in the database,
if the standard descriptors of the query structure and the standard descriptors of the database structure are dissimilar, a special descriptor of the database structure can be inferred from the standard descriptor of the query structure by means of the reference logic, or
if the special descriptors of the query structure and the special descriptors of the database structure are dissimilar, a standard descriptor of the database structure can be inferred from the special descriptor of the query structure by means of the reference logic, wherein if the special descriptors of the query structure and the special descriptors of the database structure are dissimilar, dissimilar special descriptors are reviewed to determine whether a computation logic is present in the database, so that a respective special descriptor of the database structure can be computed directly from the corresponding special descriptor of the query structure by means of the computation logic.

11. Computer readable media as claimed in claim 10, wherein the reference logic is stored in the database.

12. Computer readable media as claimed in claim 10, wherein standard descriptors present in the query structure are compared with the standard descriptors of the database, wherein identical standard descriptors are evaluated for the query.

13. Computer readable media as claimed in claim 10, wherein the special descriptors present in the query structure are compared with the special descriptors of the database, wherein identical special descriptors are evaluated for the query.

14. Computer readable media as claimed in claim 10, wherein the computation logic is stored in the database.

15. Computer readable media as claimed in claim 14, wherein, for the special descriptors of the database structure that are dissimilar to the special descriptors of the query structure for which no computation logic is present, a review is made to determine whether a reference logic to standard descriptors is at least partially present in the database.

16. Computer readable media as claimed in claim 14, wherein, for the special descriptors of the database structure that are dissimilar to the special descriptors of the query structure for which no computation logic and/or reference logic is present, a review is made to determine whether the reference logic was transmitted together with the query.

17. Computer readable media as claimed in claim 14, wherein atomic elements defining the information and/or link of a special descriptors are used as the computer logic.

18. Computer readable media as claimed in claim 17, wherein the atomic elements used are semantic, physical and linking atomic elements to define the semantic meaning, the physical memory structure, and the link between memory structure and semantics.

19. A method of querying a plurality of databases stored in computer readable media, comprising:

submitting a query in an original query structure to a plurality of databases; and
separately revising the original query structure at each of the databases, to produce query structures searchable within the respective databases,
wherein the original query structure is revised in a decentralized fashion, without middleware,
wherein the query structure and the database structure are derived from a standard structure by using a reference logic,
wherein the standard structure is described by standard descriptors, wherein the query structure and the database structure are described by at least one of the standard descriptors and special descriptors, and wherein the special descriptors and the content of the special descriptors are derived from at least one of the standard descriptors by using the reference logic, transmitting the query to the database;

making the reference logic available to the database by at least one of:

transmitting at least part of the reference logic together with the query; or the reference logic being at least partially present in the database, if the standard descriptors of the query structure and the standard descriptors of the database structure are dissimilar, a special descriptor of the database structure can be inferred from the standard descriptor of the query structure by means of the reference logic, or if the special descriptors of the query structure and the special descriptors of the database structure are dissimilar, a standard descriptor of the database structure can be inferred from the special descriptor of the query structure by means of the reference logic, wherein if the special descriptors of the query structure and the special descriptors of the database structure are dissimilar, dissimilar special descriptors are reviewed to determine whether a computation logic is present in the database, so that a respective special descriptor of the database structure can be computed directly from the corresponding special descriptor of the query structure by means of the computation logic.

20. A method of querying a plurality of databases stored in computer readable media, comprising:

submitting a query to a plurality of databases, the query containing information fields not contained in all of the databases; and separately searching for the query at the plurality of databases, each database using a reference logic at the database to infer a relationship between fields in the database and fields in the query not contained in the database, wherein each database infers the relationship in a decentralized fashion, without middleware, wherein structure of the query and structure of the database are derived from a standard structure by using a reference logic, wherein the standard structure is described by standard descriptors, wherein the structure of the query and the structure of the database are described by at least one of the standard descriptors and special descriptors, and wherein the special descriptors and the content of the special descriptors are derived from at least one of the standard descriptors by using the reference logic, transmitting the query to the database;

making the reference logic available to the database by at least one of:

transmitting at least part of the reference logic together with the query; or the reference logic being at least partially present in the database, if the standard descriptors of the query structure and the standard descriptors of the database structure are dissimilar, a special descriptor of the database structure can be inferred from the standard descriptor of the query structure by means of the reference logic, or if the special descriptors of the query structure and the special descriptors of the database structure are dissimilar, a standard descriptor of the database structure can be inferred from the special descriptor of the query structure by means of the reference logic, wherein if the special descriptors of the query structure and the special descriptors of the database structure are dissimilar, dissimilar special descriptors are reviewed to determine whether a computation logic is present in the database, so that a respective special descriptor of the database structure can be computed directly from the corresponding special descriptor of the query structure by means of the computation logic.

21. A method of querying a plurality of databases stored in computer readable media, comprising:

submitting a query in an original query structure to a plurality of databases; and separately revising the original query structure at each of the databases, independently of middleware, to produce query structures searchable within the respective databases, wherein the query structure and the database structure are derived from a standard structure by using a reference logic, wherein the standard structure is described by standard descriptors, wherein the query structure and the database structure are described by at least one of the standard descriptors and special descriptors, and wherein the special descriptors and the content of the special descriptors are derived from a least one of the standard descriptors by using the reference logic, transmitting the query to the database;

making the reference logic available to the database by at least one of:

transmitting at least part of the reference logic together with the query; or ther reference logic being at least partially present in the database, if the standard descriptors of the query stucture and the standard descriptors of the database structure are dissimilar, a special descriptor of the database structure can be inferred from the standard descriptor of the query structure by means of the reference logic, or if the special descriptors of the query structure and the special descriptors of the database structure are dissimilar, a standard descriptor of the database structure can be inferred from the special descriptor of the query structure by means of the reference logic, wherein if the special descriptors of the query structure and the special descriptors of the database structure are dissimilar, dissimilar special descriptors are reviewed to determine whether a computation logic is present in the database, so that a respective special descriptor of the database structure can be computed directly from the corresponding special descriptor of the query structure by means of the computation logic.

* * * * *